United States Patent
Hansen et al.

(10) Patent No.: US 7,515,303 B2
(45) Date of Patent: Apr. 7, 2009

(54) PROCESS FOR THE MODELING OF DOTS FOR A SCREEN

(75) Inventors: Michael Hansen, Kiel (DE); Jörg Olaf von Wechgeln, Wattenbek (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 532 days.

(21) Appl. No.: 11/392,060

(22) Filed: Mar. 29, 2006

(65) Prior Publication Data

US 2006/0221399 A1    Oct. 5, 2006

Related U.S. Application Data

(60) Provisional application No. 60/667,104, filed on Mar. 31, 2005.

(30) Foreign Application Priority Data

Mar. 29, 2005    (DE)    ............... 10 2005 014 104

(51) Int. Cl.
  *H04N 1/405*    (2006.01)
(52) U.S. Cl. .................... 358/3.13; 358/3.22
(58) Field of Classification Search ............... 358/1.9, 358/3.06, 3.13, 3.14, 3.16, 3.21, 3.22, 466, 358/534–536; 382/270
  See application file for complete search history.

(56) References Cited

U.S. PATENT DOCUMENTS

| | | | | |
|---|---|---|---|---|
| 5,111,310 A | * | 5/1992 | Parker et al. ............... | 358/3.19 |
| 5,579,457 A | * | 11/1996 | Hall ........................... | 345/596 |
| 5,685,652 A | * | 11/1997 | Asai ...................... | 400/120.07 |
| 6,433,891 B1 | * | 8/2002 | Yu et al. ...................... | 358/1.9 |
| 2006/0152767 A1 | * | 7/2006 | Asai et al. .................. | 358/3.23 |
| 2006/0221399 A1 | * | 10/2006 | Hansen et al. ............. | 358/3.06 |

FOREIGN PATENT DOCUMENTS

| | | |
|---|---|---|
| EP | 1 571 826 A2 | 9/2005 |
| WO | WO 90/04898 | 5/1990 |
| WO | WO 2004/100530 | 11/2004 |

* cited by examiner

*Primary Examiner*—Scott A Rogers
(74) *Attorney, Agent, or Firm*—Laurence A. Greenberg; Werner H. Stemer; Ralph E. Locher

(57) ABSTRACT

A process for the modeling of dots in the generation of a threshold matrix for a screen for the production of a screen form for the printing of image data. The dots are described by model points built up from computed points with an assigned density value. For modeling of ink-jet printing, in the area of overlap of neighboring model points the density values of the computed points are added to form a sum density, the sum density is limited to a maximum possible blackening, and the percentages of the sum density which exceed the maximum possible blackening are distributed to the neighboring computed points. For the modeling of offset printing, in the area of overlap of neighboring model points the maximum of the density values of the computed points is determined as the resulting density and with a filter operation a dilatation of the model points is effected.

12 Claims, 7 Drawing Sheets

PROCESS FOR THE MODELING OF DOTS FOR A SCREEN

CROSS-REFERENCE TO RELATED APPLICATION

This application claims the benefit, under 35 U.S.C. § 119(e), of provisional application No. 60/667,104, filed Mar. 31, 2005; the application also claims the priority, under 35 U.S.C. § 119, of German patent application No. 10 2005 014 104.8, filed Mar. 29, 2005; the prior applications are herewith incorporated by reference in their entirety.

BACKGROUND OF THE INVENTION

Field of the Invention

The invention relates to the field of screening (half-toning) of image data in electronic reproduction technology and relates to a process for the modeling of dots which are used in the recording of a screen. The image data describe the content of a printed page, or of a printed sheet on which several printed pages are combined. The printed pages contain images, texts, and graphic elements whose image data have previously been assembled in an electronic system for the preparation and processing of printed pages according to a layout.

In multicolor process printing, the image data to be reproduced are generally printed in the four process colors cyan, magenta, yellow, and black (CMYK). The originals of the images are scanned optoelectronically, point by point and line by line, e.g., in a color scanner, in order to obtain for each scanned image point the color components red, green and blue (RGB) as color values. The color values of a scanned color image are then converted by a color correction calculation into the color separation values for the color separations cyan, magenta, yellow, and black (CMYK). After the conversion, for each image point four color separation values are available as tone values in the value range from 0 to 100%. The color separation values are a measure of the ink densities with which the four process colors cyan, magenta, yellow, and black are printed on the substrate. In special cases, wherein in addition to the four process colors special process colors (spot colors) are used, each image point is identified by as many color separation values as there are process colors. The color separation values can be encoded digitally, e.g., with 8 bits for each image point and process color, where the tone value range from 0 to 100% is subdivided into 256 tone value levels.

In addition to image data for color images, during the electronic production of printed pages, image data for text and for graphic elements are produced, said image data, together with the images, being combined according to the specifications of a layout to form the image data for entire printed pages. The data from several printed pages are finally mounted to form the image data for a printed sheet. These printed sheet data are likewise provided as color separation values for output or intermediate storage.

Different tone values of a color separation to be reproduced can be reproduced in the print only by means of area modulation of the process colors applied, i.e., by half-toning. For this, e.g., for offset printing using the color separation values CMYK, four screened (or, half-toned) color separations for the process colors cyan, magenta, yellow, and black are exposed in a color separation exposer, also called a recorder or imagesetter, point by point and line by line, on a substrate. The substrate can be a lithographic film, with which printing plates are subsequently produced in a photographic recopying process, or the printing plates are exposed directly in the exposer. The printing plate exposure can also be integrated into a press. The screened color separations serve as printing forms for the multicolor process printing. In the press, the overprinting of the differently inked, screened printing forms is then carried out to form a multicolor reproduction. There are also digital presses which print the screened color separation data directly onto the substrate without the use of a printing plate, e.g., with an electrophotographic or ink-jet printing process.

For the area modulation of the process colors, processes for dot half-toning are known wherein different tone values of the color separation data are converted into screen dots of different size. The screen dots are arranged in screen cells which subdivide the area of the image data regularly in two orthogonal directions. The screen cells are very small. For example, there are square screen cells with a side length (screen width) of $\frac{1}{60}$ cm so that in viewing the final printed product the printed screen dots are integrated again by the eye to form continuous tone values. Through the overprinting of the screen dots arranged in a periodic form, disturbing moiré structures can appear in the print. In order to minimize such structures, the dot matrices of the four process colors are arranged at different screen angles, for example at the screen angles 0, 15, 45 and 75 degrees.

In the prior art process for dot screening, the screen dot in a screen cell is, as a rule, produced by way of a threshold value matrix. The recording area is resolved into the dots which are smaller than the screen dots by an order of magnitude. The dots have, for example, a size of $\frac{1}{1000}$ cm side length. The threshold value matrix covers the area of one or more screen dot cells and contains a threshold value for each dot within this area. During the recording of the color separations, the screen dots in the individual screen cells are assembled from dots. The decision as to whether a dot, as part of a screen dot within a screen cell, is to be recorded or not is made by comparing the tone values of the color separation data with the threshold values of the threshold value matrix at the location of the respective dot, whereby the tone values are converted into highly resolved binary values with only two lightness values, which form the pattern of the modulated dot matrix. The two lightness values specify whether the dot in question is recorded or not recorded.

With the known dot matrix process, half-tone systems with arbitrary screen widths and screen angles and very good reproduction quality can be produced. However, in practice it has proven difficult to find screen systems for all possible instances of use which exhibit no moiré. Such particular instances of use occur when more than four process colors are supposed to be overprinted or when the dot matrix with the fine patterns of the image content, e.g., a textile pattern, produces disturbing moiré structures.

Alternatively to the dot matrix process, which is also called amplitude-modulated screening (autotypical screening), the area modulation of the process colors can also be done according to frequency-modulated screening (noise half-toning; stochastic screening), wherein the tone values of the color separation data are reproduced by means of an arrangement of small dots, as a rule of the same size, which are distributed in the recording area randomly but also as uniformly as possible. The number of dots per unit area determines the tone value reproduced.

Also in many processes of frequency-modulated half-toning, the decision as to whether a dot should be recorded or not is also effected by comparing the tone values of the image data to be reproduced with the threshold values of a threshold value matrix which contains a random distribution of threshold values. For instance, the threshold value matrix is square and contains 256×256 threshold values. The threshold value matrix is repeated periodically in the horizontal and vertical directions, so that the entire recording area is covered without gaps by threshold value matrices. Each dot in the recording area is thus assigned a threshold value. During the half-toning, for each dot a tone value of the color separation data is compared with the associated threshold value in the matrix. If the tone value is greater than the threshold value, the dot is recorded; when the tone value is less than or equal to the threshold value, the dot is not recorded. With the increase in the tone value, the number of recorded points increases until, finally, for the maximum tone value, the entire area covered by the threshold value matrix is recorded. In this way, for the entire printed page or the entire printed sheet, a random distribution of the recorded points is produced. Due to the random distribution of the recorded points, no Moiré with regular patterns of the image content can arise. If a different distribution of the threshold values in the threshold value matrix is chosen for each of the color separations CMYK, it is also the case that no Moiré structures are produced by the overprinting of the color separations.

To produce a suitable random distribution of the threshold values within the threshold value matrix, various processes are known. In these, the intention is to produce for all tone values of the image data, on the one hand, a random distribution of the dots but, on the other hand, a distribution of the dots which does not contain any disturbing patterns and which appears sufficiently uniform to the eye.

U.S. Pat. No. 5,111,310 describes a process for generating a threshold value matrix whose threshold value distribution has the spectrum of so-called blue noise, i.e., at low frequencies the spectrum has no components below a limiting frequency. This has the effect that the threshold value distribution for all tone values produces visually pleasant patterns of dots which do not act so unsteadily as a distribution with white noise. The distribution of the threshold values is constructed with an iterative process which, for each tone value, transforms the produced pattern of the dots into a spectral representation, shapes the spectrum with a filter according to the spectrum of blue noise, and then transforms it back into a modified recording pattern. From the comparison between the modified recording pattern and the original recording pattern, a decision is made as to which threshold values of the threshold value matrix must be modified in order to come closer to the intended blue noise.

U.S. Pat. No. 5,579,457 discloses a process for generating a threshold value matrix wherein the matrix is subdivided into subregions and, in each subregion, the threshold values are put into the matrix according to a randomly placed spiral function. Thereby patterns of the dots are produced which are arranged along randomly distributed spiral arms. With increasing tone value, further recorded points are added, which fill up the gaps in the spiral arms, i.e., the order wherein the recording pattern is supplemented by further recorded points with increasing tone value is determined by the spiral functions. In this way, randomly distributed, rounded shapes are produced, which act uniformly and calmly on the eye.

Several processes for generating a threshold value matrix work with filters which are applied to the dot patterns produced with the various tone values in order to optimize the distribution of thresholds. For example, it is determined with a low-pass filter where in the pattern of dots a relative gap between the points is present, i.e., where the average spacing of the dots is greatest. At this position a next threshold value is then placed so that there with increasing tone value an additional dot is recorded which fills the gap. In this way, for all the tone values a random distribution of dots is produced which however is perceived by the eye as relatively uniform. Such a process is described in our copending patent application Ser. No. 11/289,145 (German, unpublished DE 10 2004 057 461), wherein the distribution of threshold values is optimized for the appearance of desired and undesired partial patterns with the use of two low-pass filters of different width and in addition with the use of a number of tests of the recorded bit pattern. To better understand the invention to be explained later the first steps of the process described in our application Ser. No. 11/289,145 and DE 10 2004 057 461 (both incorporated herein by reference in their entirety) are sketched here in brief.

First, a threshold value matrix for a base screen with optimized properties is generated. In a second phase a separate threshold value matrix is then generated from the base screen for each of the process colors CMYK. As preparation a two-dimensional data field for the threshold value matrix of the base screen is set up which consists of MX×MY threshold values, e.g., of 256×256 threshold values. FIG. 1 shows this threshold value matrix 3 of the base screen. All the threshold value positions are initialized with the average value (MX×MY)/2 which corresponds to the average tone value with 50% surface coverage of the screen. Furthermore, a binary data field 4 for the later entry of black points and a binary data field 5 for the later entry of white points are set up (FIG. 2). Both binary data fields have the same dimensions, MX×MY, as the threshold value matrix 3. The binary data field 4 for black points is initialized with the binary value 0 and the binary data field 5 for white points is initialized with the binary value 1. The binary value 0 identifies a white point and binary value 1 identifies a black point in the screen to be produced for a tone value. In the binary data field 4 the base screen is built up for increasing tone values beginning at 0% and in the binary data field 5 the base screen is built up for decreasing tone values beginning at 100%. In so doing, it is assumed that with the half-toning of the tone value the decision for the dot is made according to the relation Tone value>threshold value=>dot black Tone value≦threshold value=>dot white   (1)

The production of the base screen begins with a seeding phase wherein so-called seed points are entered into the binary data fields 4 and 5 and into the threshold value matrix 3. Black seed points are black points set in the highlights range of the tone value scale and having an extension of, for example, 2×2 dots. White seed points are white points set in the low range of the tone value scale and having an extension of, for example, 2×2 dots. First, the first four black seed points are set in the binary data field 4 at the following positions:

$X=0,25*MX+xoffset\ y=0,25*MY+yoffset$ $X=0,75*MX+xoffset\ y=0,75*MY+yoffset$ $X=0,75*MX+xoffset\ y=0,25*MY+yoffset$ $X=0,25*MX+xoffset\ y=0,75*MY+yoffset$   (2)

So that no symmetric structures arise, the coordinates are each changed by different random offset values xoffset and yoffset which can be positive or negative. Likewise, the first four white seed points are at the following positions in the binary data field 5:

$X=0.5*MX+xoffset\ y=0.5*MY+yoffset$ $X=MX+xoffset\ y=MY+yoffset$ $X = MX + x\text{offset } y = 0.5*MY + y\text{offset}$ $X = 0.5*MX + x\text{offset } y = MY + y\text{offset}$ (3)

FIG. 3 shows the binary data fields 4 and 5 with the respective first four black or white seed points 6 which are greatly enlarged in the drawing for the purposes of illustration.

In the threshold matrix 3 the threshold values 0, 1, 2, and 3 are entered in the positions which are occupied by the first black seed point 6, the threshold values 4, 5, 6, and 7 are entered in the positions which are occupied by the second black seed point 6, and so on. For each subsequently set black seed point 6 the corresponding positions in the threshold value matrix 3 are occupied by the next four free threshold values in increasing order. For the first white seed point 6 the corresponding positions in the threshold value matrix 3 are occupied by the threshold values 65535, 65534, 65533, and 65532, for the second white seed point 6 by the threshold values 65531, 65530, 65529, and 65528, and so on. For each subsequently set white seed point 6 the corresponding positions in the threshold value matrix 3 are occupied by the next four free threshold values in decreasing order. Generally, the available threshold values are assigned in increasing order beginning at 0 to the black dots of the binary data field 4 and the available threshold values are assigned in decreasing order beginning at (MX×MY−1) to the white dots of the binary data field 5.

After the first four black and the first four white seed points 6 have been set in the manner described, one new seed point 6 is subsequently set alternating between black and white, and the corresponding positions in the threshold value matrix 3 are each assigned the next free threshold values in increasing or decreasing order. The position of the newly to be set seed points 6 is determined by the result of two low-pass filterings in the respective binary data field 4 or 5. This is explained in the example of a newly to be set black seed point 6. First, the binary data field 4 is subjected to a low-pass filtering with a two-dimensional wide filter core, which, for example, includes 63×63 coefficients. In the filter result the points are determined whose filter values belong to the smallest 12.5% of all the filter values. FIG. 4 shows the result of the subdivision of the filter values, where the smallest 12.5% of the filter values are represented as white areas and the other filter values as a hatched area. The white areas mark the areas in the binary data field 4 which form the largest gaps between the black seed points already set. In one of these gaps the next seed point 6 is set. The precise position is determined for this by the gap areas determined with the first low-pass filtering being subjected to a second low-pass filtering with a narrow filter core, which, for example, includes 17×17 filter coefficients. At the point which has the smallest filter result of the narrow low-pass filter, the next black seed point 6 is set.

The wide low-pass filter discovers asymmetries within the binary data field 4 which, in large surfaces screened with the same tone value, would become visible as periodic interference with a period determined by the size of the threshold value matrix 3. The narrow low-pass filter detects the points in the binary data field 4 which are perceived by the eye as local disturbance or as residual noise. Preferably, low-pass filters with a Gaussian curve are used. FIG. 5 shows the filter functions of the wide and narrow low-pass filters in comparison. In using the filter, care is taken that the threshold value matrix 3 is continued periodically in all directions later during screening of the color separation data in the recording surface 1. If parts of the filter core lie outside of the binary data field, they are thus "turned over" on the opposite side or on the opposite corner of the binary data field.

In the course of the seeding phase a new seed point 6 is subsequently set alternating between black in data field 4 and white in data field 5 and the corresponding positions in the threshold value matrix 3 are each assigned the next free threshold values in increasing or decreasing order. The position of the new white seed point 6 is also determined in the manner described by means of a wide and a narrow low-pass filter which are both applied to the binary data field 5. In the filter result of the wide filter the points are determined whose filter values belong to the largest 12.5% of all the filter values. The areas so marked form the gaps between the white seed points 6 already set. In these gap areas the point with the greatest filter result is sought, at whose position the next white seed point 6 is set.

During the seeding phase certain conditions are still observed during the setting of the black and white seed points 6. A new seed point 6 is, for example, only set where it does not overlap any black or white seed point which is present and where it maintains a minimum distance from the seed points of its own color already present. As the theoretical position which was determined by the low-pass filter, the conditions for setting a seed point 6 are checked. The more seed points 6 are present, the more difficult it becomes to meet the conditions precisely at the theoretical position. Then the process is begun of adding individual points at seed points 6 already present. With this, the transition to the so-called growth phase occurs. During the growth phase the points in the immediate neighborhood of the theoretical position are tested for the presence of certain preferred bit patterns and if such a bit pattern is found, the next seed point is set there. Thereby a base screen with a random distribution of dots is produced which contains certain desired structures which are perceived by the eye as restful and pleasant. FIG. 6 shows the base screen produced with 50% surface coverage, that is, when the prepared threshold value matrix 3 is used for half-toning a tone value of 50%.

In the process of the above-mentioned Ser. No. 11/289,145 and DE 10 2004 057 461 the low-pass filterings are applied to recorded bit patterns which are built up of black and white points which are square, without gaps, and set at one another. FIG. 7 shows this as an enlarged extract of the data field 4.

However, such bit patterns of idealized binary dots 7 only reproduce the real printed image of a screen recorded in the offset printing process or with an ink-jet printing process only inadequately since the form of the real dots and the point growth of the dots or the running of the printing ink between neighboring dots and the overlapping present in reality are not taken into account. These parameters are independent of the composition of the paper as well as of the covering power and viscosity of the printing ink and have a great effect on the result of printing. For the production of still better distribution of the threshold values it would thus be advantageous to calculate the pattern on which the filter operations are carried out by means of modeling the dots which takes into account the stated effects of the real recording.

SUMMARY OF THE INVENTION

It is accordingly an object of the invention to provide a method of modeling print dots for a screen, which overcomes the above-mentioned disadvantages of the heretofore-known devices and methods of this general type and provides for an improved process for the generation of a threshold value matrix for the frequency-modulated screening of image data.

With the foregoing and other objects in view there is provided, in accordance with the invention, a method of modeling print dots and generating a threshold value matrix for producing a screen form for printing image data, the method which comprises:

determining values of the dots of the screen form by comparing tone values of the image data to threshold values of the threshold value matrix, and generating the threshold value matrix by:
(a) setting dots in a screen data field;
(b) determining a first position by low-pass filtering the screen data field with at least two low-pass filters having mutually different widths;
(c) searching for certain partial patterns of dots at the first position or in a neighborhood of the first position, determining at that location a second position, and setting a next dot at the second position; and
(d) entering a next free threshold value at the second position in the threshold value matrix;

wherein the print dots are model points with a base surface and a density gradient over the base surface, where the model points are built up from computed points, and a density value according to a function g(x,y) is assigned to a computed point.

In other words, the novel method achieves the objective by the description of the dots by means of a mathematical model which approximates the form and the density gradient as well as the overlapping of the real dots for the printing process used as precisely as possible. To the exposure pattern calculated with consideration of the model the filter operations of the prior application Ser. No. 11/289,145 and DE 10 2004 057 481 are then applied in order to produce an improved screen, or half-toning system. Moreover, the model makes possible a realistic printed image simulation and thus, even in the preliminary design of a half-toning system, a better evaluation of the printed image quality to be expected with the screen system.

In accordance with further preferred variations of the invention, the function g(x,y) is a Gaussian function. It is further advantageous if the base surface is a circle or an ellipse. Also, the base surface may be a square or a rectangle with rounded corners.

In accordance with an additional feature of the invention, in the area of overlap of neighboring model points the function values of the computed points of the model points are added to form a sum density. Preferably, the sum density is limited to a maximum possible blackening. Also, the percentages of the sum density which exceed the maximum possible blackening may be distributed to the neighboring computed points.

In accordance with another feature of the invention, in the area of overlap of neighboring model points the maximum of the function values of the computed points of the model points is determined as the resulting density. It is advantageous to apply to the resulting density of the computed points a filter operation which causes a dilatation of the model points. A filter is preferably applied, the sum of whose filter coefficients is not equal to 1. Depending on the tone value of the image data, different filters, each with a different sum of the filter coefficients, may be applied.

In accordance with a concomitant feature of the invention, the resolution of the half-tone data field is greater by an integral factor than the resolution of the threshold value matrix.

Other features which are considered as characteristic for the invention are set forth in the appended claims.

Although the invention is illustrated and described herein as embodied in a process for the modeling of dots for a screen, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
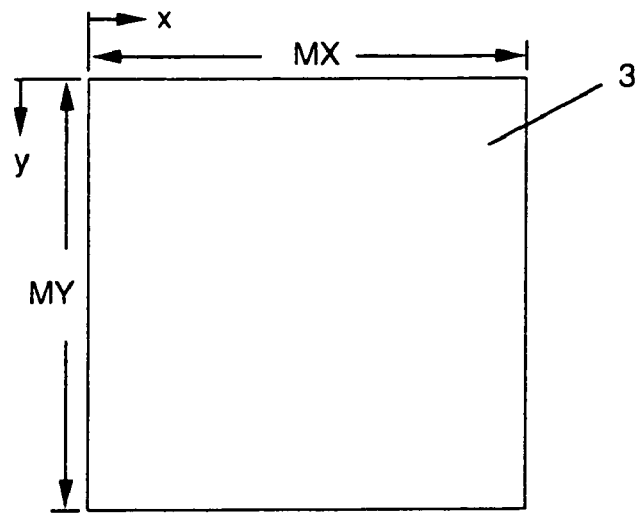
FIG. 1 the threshold value matrix of the base screen.
Figure 2:
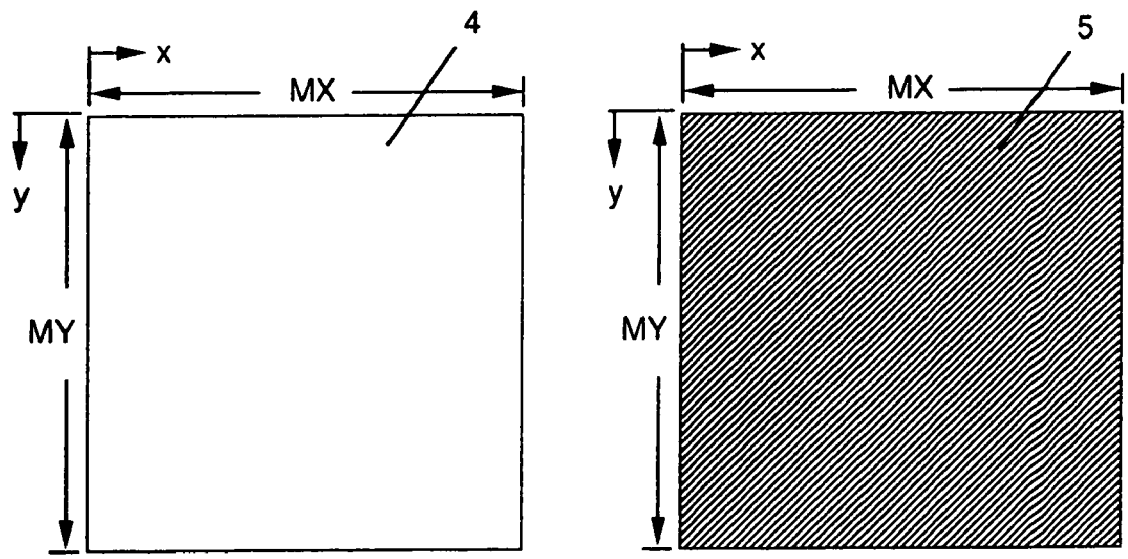
FIG. 2 the binary data fields of the base screen.
Figure 3:
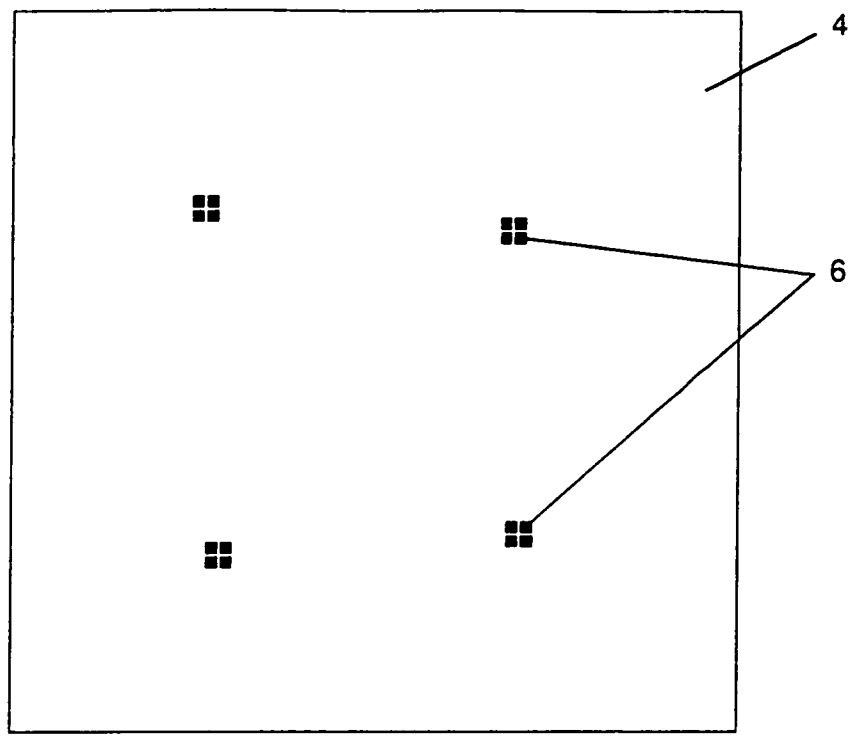
FIG. 3 the binary data fields with the first seed points.
Figure 3:
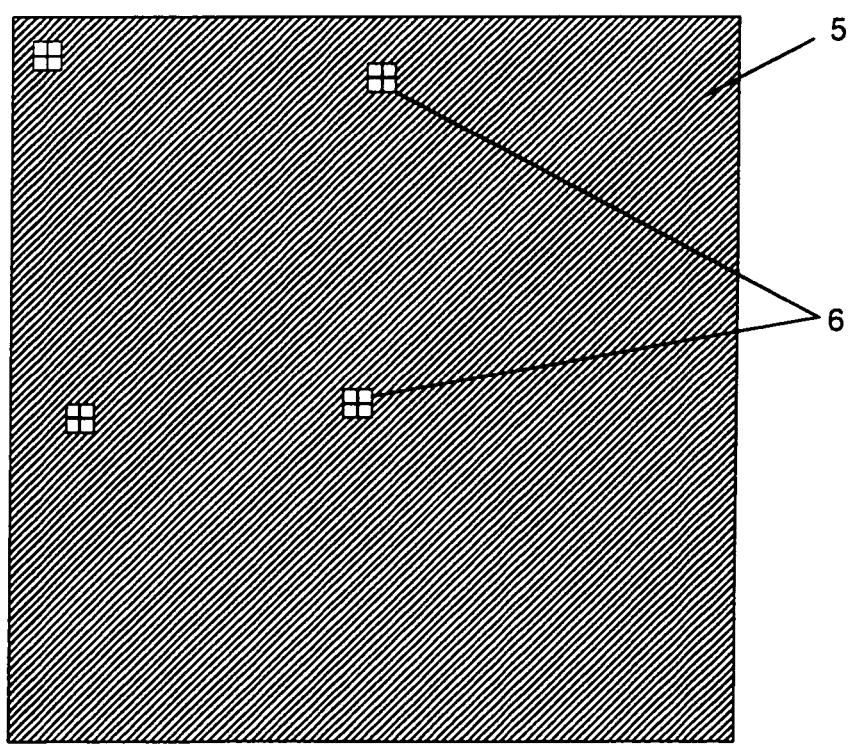
Figure 4:
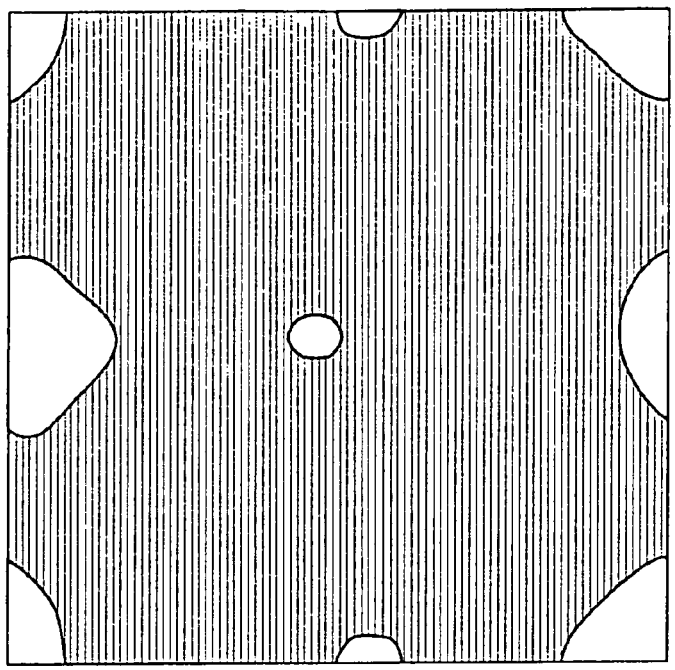
FIG. 4 the filter result of a wide low-pass filter.
Figure 5:
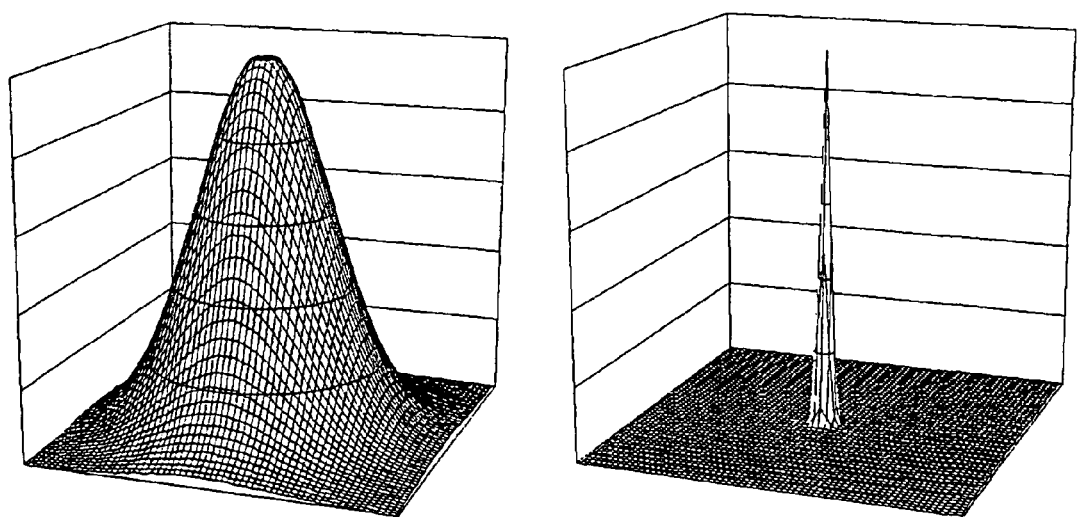
FIG. 5 the filter function of the wide and narrow low-pass filter.
Figure 6:
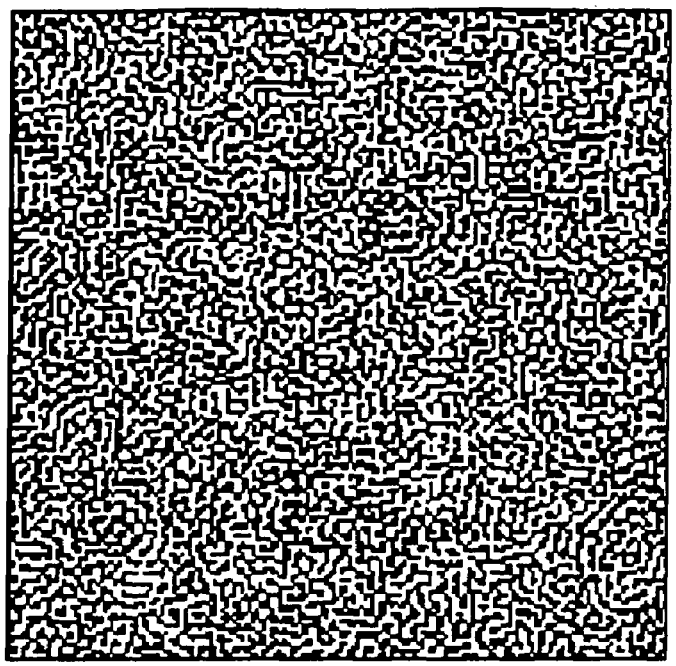
FIG. 6 the produced base screen.
Figure 7:
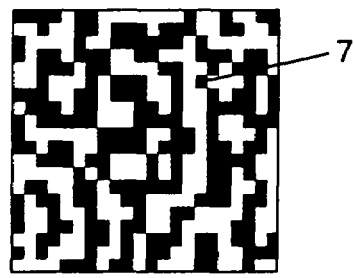
FIG. 7 an enlarged extract of the base screen.
Figure 8:
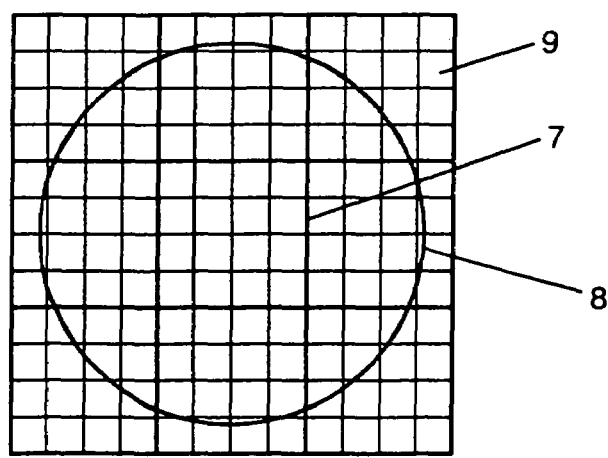
FIG. 8 a model point for ink-jet printing.
Figure 9:
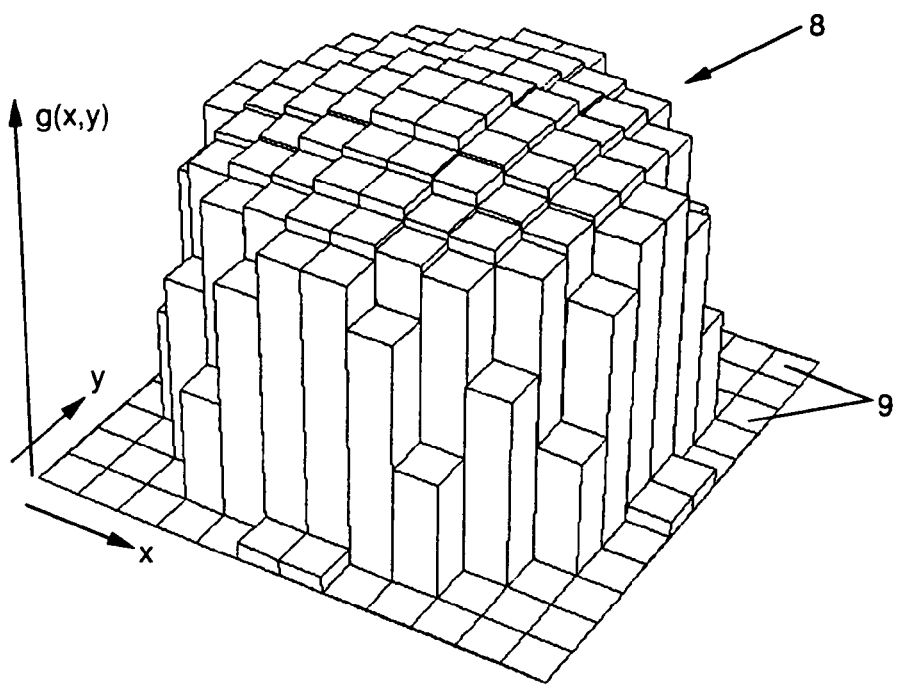
FIG. 9 the density gradient g(x, y) of the model point for ink-jet printing.
Figure 10:
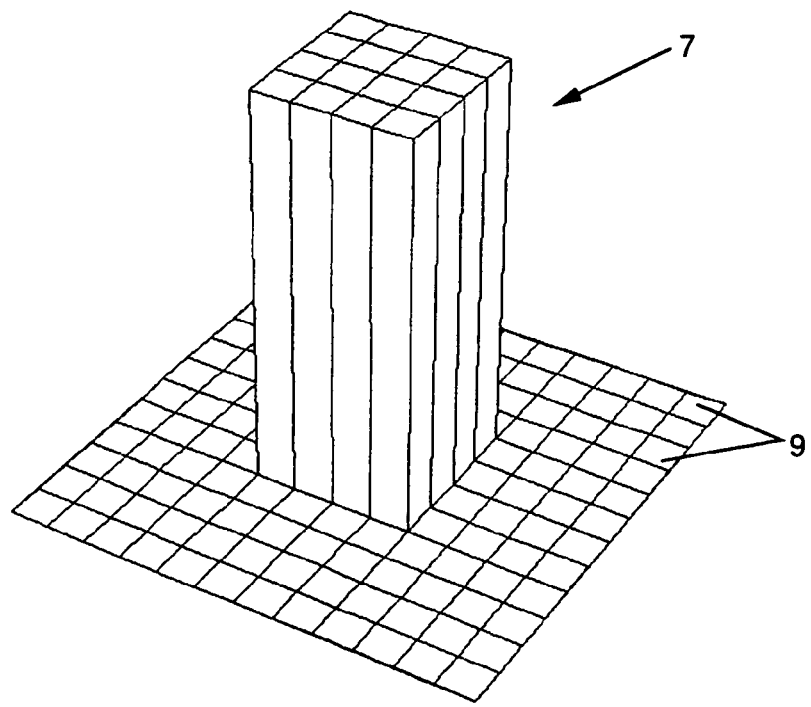
FIG. 10 a binary dot.

As a first exemplary embodiment of the process according to the invention, a modeling of the dots is described which characterizes the behavior of the ink drops in an ink-jet printing process. FIG. 8 shows a model point 8 which has a circular base area and which is larger than the binary square dot 7. The model point 8 is furthermore subdivided into computed points 9 in order to be able to process them in a digital computation procedure. The resolution of the computed points 9, for example, is chosen to be four or eight times higher than the resolution of the binary dots 7. In FIG. 8, a fourfold higher resolution of the computed point 9 is shown. Inside its base area, the model point 8 does not have a constant optical density, but rather the optical density has a maximum value in the center and drops off towards the perimeter. For the description of the density gradient over the base area of the model point 8, a function value g(x, y) will be assigned to each computed point 9. FIG. 9 illustrates this in a three-dimensional representation. FIG. 10 shows for comparison the binary dot 7 in a corresponding representation. Preferably, a two-dimensional Gaussian function will be assumed for the density gradient g(x, y).

$$g(x,y)=k1 \times e^{-k2(x^2+y^2)}$$

With the constants k1 and k2, the values of the function in the center and at the edge of the model point 8 can be adjusted to the typical density values of a real dot. For the computed point 9 on the outer periphery of the model point 8, the Gaussian function is multiplied again by the relative surface percentage with which the computed point 9 lies within the base area of the model point 8. Depending on the resolution of the printing process in the x-axis direction or in the y-axis direction, the real dots can even have an oblong form. In this case, an elliptical base area of the model point 8 is assumed and the two-dimensional Gaussian function will be modified accordingly. In place of the Gaussian function, other functions can also be used, e.g., two-dimensional polynomial functions. The function values g(x, y) of the computed point 9 could also be obtained from a microdensitometric measurement of real image dots of the printing procedure.

Figure 11:
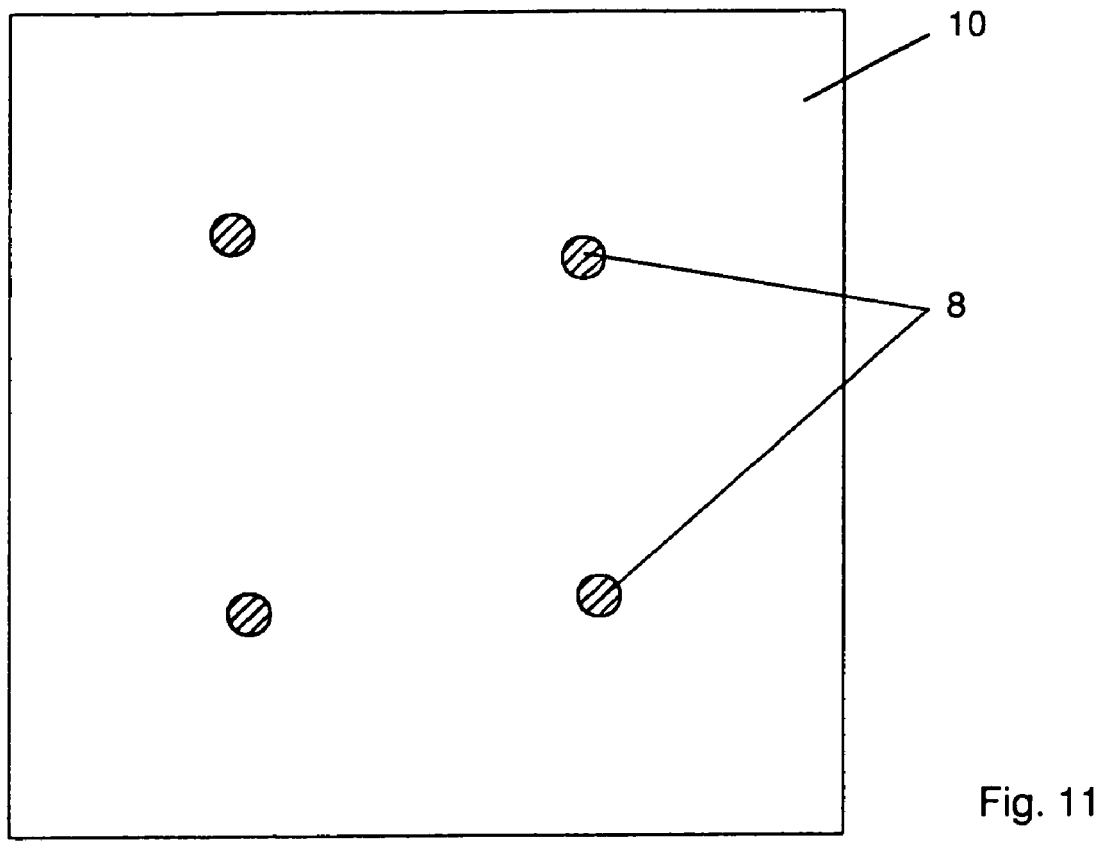
FIG. 11 a screen data field.

For the production of a printed image simulation for a half-tone data field 10 with a definite surface coverage, the model point 8 is set in the halftone data field 10 at the same position (FIG. 11) as according to the state of the art the binary dots 7 in the binary data fields 4 or 5, where the half-tone data field 10 is computed at the resolution of the computed point 9. Thereby neighboring model points 8 overlap each other according to the extent and size of the ink drops. For example, the resolution of an ink-jet printer is 283 dots/cm (720 dpi) corresponding to a dot spacing of 35.27 μm at a dot diameter of 90 μm, so that a dot extends over 3×3 dot positions (FIG. 8). The model therefore must also describe to which density values the printing ink of the individual model points 8 in the area of overlap are added and how excess ink runs into the area around the model point 8. Preferably it is assumed that the function values g1(x, y) and g2(x, y) from neighboring model points in the area of overlap add up to a total density Ds, where the result is nonetheless bounded by the maximum possible blackness MaxBlack.

$$Ds(x,y)=\text{Min}\{g1(x,y)+g2(x,y); \text{MaxBlack}\} \quad (2)$$

The maximum possible blackness MaxBlack has the value 255 if the function values g1(x, y) and g2(x, y) and the entire printed image simulation are computed with a tone value resolution of 8 bits. In ink-jet printing it is observed that the ink flows between neighboring points. In order to take account of this effect in the model an ink excess RestInk is first determined for each computed point 9 of the printed image simulation.

$$RestInk(x,y)=\text{Max}\{g1(x,y)+g2(x,y)-\text{MaxBlack};0\} \quad (3)$$

The ink excess determined for each computed point 9 flows to the immediately neighboring computed points 9. This means that to an arbitrary computed point 9 certain weighted portions of the ink excesses flow from its neighboring computed points 9. The sum SumInk of the flowing percentages follows as $$SumInk(x,y)=\Sigma w(i) \times RestInk(xi,yi) \quad (4)$$

Figure 12:
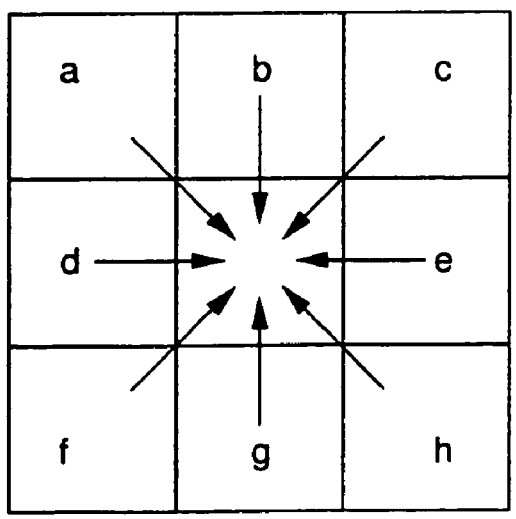
FIG. 12 the flow of excess ink from the neighboring points.

Preferably the summation extends over all eight immediately neighboring computed points a to h (FIG. 12), where the weight factors w(i) are chosen to be inversely proportional to the distance to the neighboring points and the sum of the weight factors has the value 1. Thus for the weight factors w(i) the following holds:

$$w(i)=1/(2\times(2+\sqrt{2})) \text{ for } i=b,d,e,g$$

$$w(i)=1/(2\times\sqrt{2}\times(2+\sqrt{2})) \text{ for } i=a,c,f,h \quad (5)$$

Alternatively the summation of the ink excesses can also extend only over the four neighboring points b, d, e, g (with w(i)=¼) in order to simplify the computation.

Finally, the sum density Ds and the sum SumInk of the flowing ink excesses for each computed point 9 are added in order to obtain a total density Dg resulting from the overlap of the model points 8 and the flow of excess ink.

$$Dg(x,y)=Ds(x,y)+SumInk(x,y) \quad (6)$$

Along with this, a new ink excess above the maximum possible blacking MaxBlack can in turn appear, where the total density Dg must be limited to MaxBlack.

$$RestInk'(x,y)=\text{Max}\{Dg(x,y)-\text{MaxBlack};0\}$$

$$Dg'(x,y)=\text{Min}\{Dg(x,y);\text{MaxBlack}\} \quad (7)$$

With the new values RestInk'(x, y) and Dg'(x, y) the distribution computation of the ink excess at the neighboring points is repeated, where three to four iterations of this computation yield a good printed image simulation of the ink-jet print.

As a second embodiment example of the process according to the invention, a modeling of the dots is described which characterizes the behavior of the printed points in offset printing. In offset printing first the dots which form the screened printed image are exposed on a printed plate in a laser exposer. Then in the printing press the exposed dots are inked with the printing ink, transferred from the printing plate to a rubber blanket, and from there they are transferred further, or offset, as printed points onto the paper.

Figure 13:
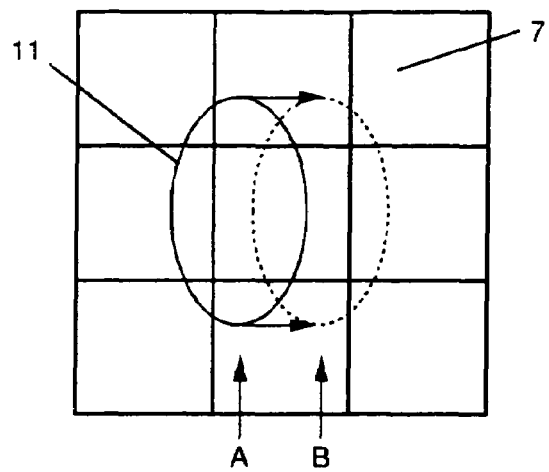
FIG. 13 the laser exposure of a dot.
Figure 14:
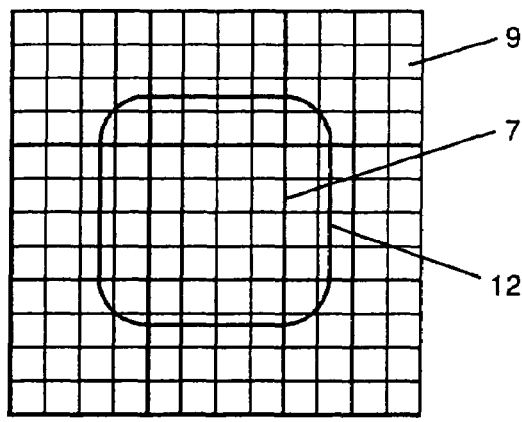
FIG. 14 a model point for offset printing.
Figure 15:
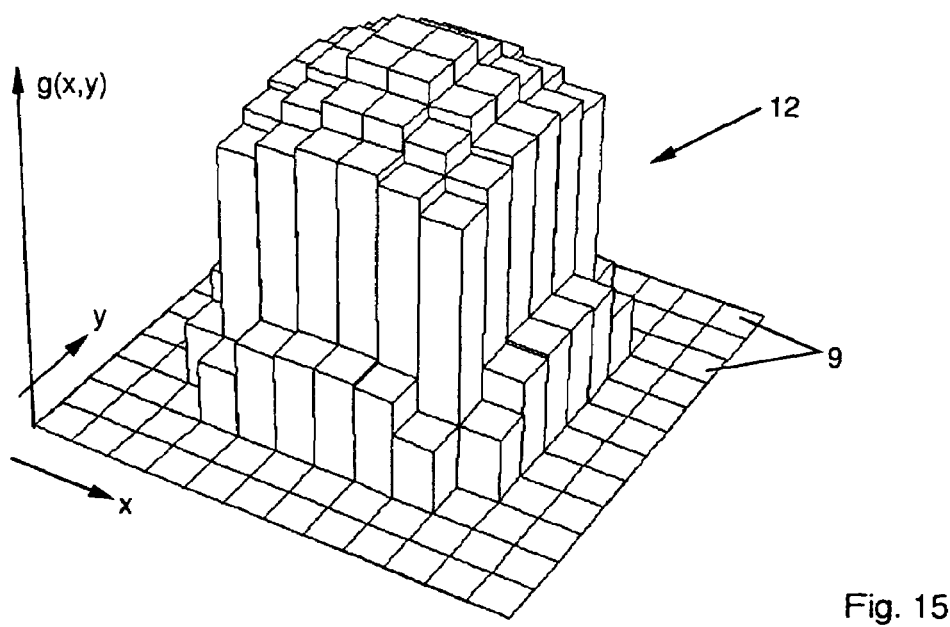
FIG. 15 the density gradient g(x, y) of the model point for offset printing.

In the exposure of the printing plate a focused laser beam is moved over the printing plate and, controlled by the screened printed image to be exposed, switched on or off. FIG. 13 shows a typical elliptical exposure spot 11 of the focused laser beam which, for example, is somewhat larger than a binary dot 7. In order to expose a real dot, the laser beam is switched on during its movement in a first position A and shortly thereafter switched off once again in a second position B. Thereby a dot arises which is not round but rather rectangular. Preferably in this case a model point is thus chosen whose base surface is a square with rounded corners. FIG. 14 show this model point 12. The model point 12 is also subdivided into computed points 9, in FIG. 14 with a four times higher resolution than the resolution of the binary dots 7. Within its base surface the model point 12 also has a density gradient which is described by a function g(x, y), preferably by a two-dimensional Gaussian function. FIG. 15 illustrates this in a three-dimensional representation. For the computed points 9 on the periphery of the model point 12 the Gaussian function is multiplied by the relative surface percentage with which the computed point 9 lies within the base surface of the model point 12. Depending on the resolution of the printing process in the x-direction or in the y-direction the real dots can also have an oblong form. In this case the base surface of the model point 12 is a rectangle with rounded corners and the function g(x, y) is modified accordingly.

In negative printing plates the exposed surfaces are the printing surfaces, that is, the model points 12 used for the printing simulation directly describe the printing surface. In positive printing plates however, the non-exposed surfaces are the to be printed surfaces. Since the exposed dots as a rule are larger than the binary dots 7, the printing surfaces become correspondingly smaller. For positive printing plates this behavior in the printed image simulation is taken into account by the binary data being inverted before the computation of the model points 12 and subsequently the printed image simulated with the model points 12 being inverted once again.

To produce the printed image simulation for a half-tone data field 10 with a certain surface coverage the model points 12 in the half-tone data field 10 are set at the same positions as previously the binary dots 7 in the binary data fields 4 or 5. In the area of overlap of neighboring model points 12 the resulting density Dr is then preferably determined by finding the maximum value of the function values g1(x,y) and g2(x,y).

$$Dr(x,y)=\text{Max}\{g1(x,y)+g2(x,y)\} \quad (8)$$

With this, the behavior during exposure of the dots is better described than with an addition of the function values as in the case of ink-jet printing.

In offset printing the printed points are enlarged somewhat by the transfer of the printing ink from the printing plate to the rubber blanket and from there further to the paper. This is also called point growth. Thereby an increase in tone value of the surface coverage in screened surfaces results. The point growth is modeled in the printed image simulation by a filter operation being applied repeatedly to the density distribution of the computation points 9 which results after the setting of the model points 12 and after the application of the equation 8, where with said filter operation a dilation of the model points 12 is effected. In practice one to four sequential filterings is sufficient. Preferably a two-dimensional dimensional filter with 5×5 filter coefficients h(u, v) which are computed according to the Gaussian function is used as the dilation filter.

$$h(u,v)=e^{-(u^2+v^2)/\sigma} \quad (9)$$

The following table shows an example of the values of the filter coefficients h(u,v).

TABLE 1

| | | | | |
|---|---|---|---|---|
| 0.011 | 0.031 | 0.044 | 0.031 | 0.011 |
| 0.031 | 0.086 | 0.122 | 0.086 | 0.031 |
| 0.044 | 0.122 | 1.000 | 0.122 | 0.044 |
| 0.031 | 0.086 | 0.122 | 0.086 | 0.031 |
| 0.011 | 0.031 | 0.044 | 0.031 | 0.011 |

Unlike a normal low-pass filter the sum of the filter coefficients is greater than 1. Here it has the value 2.3. That is the prerequisite for the filter causing a dilatation. With the parameter σ the width of the Gaussian function can be changed, whereby the sum of the filter coefficients and thus the dilation width can be set to a desired value. In so doing, the central filter coefficient h(0,0) always has the value 1. Since the point growth during printing is different for the different tone values, filters with different dilation width, i.e., with different sum of filter coefficients, must be used depending on the simulated tone value. The following table shows as an example the necessary coefficient sums for different tone values.

TABLE 2

| | Tone value | | | | | | | | | | |
|---|---|---|---|---|---|---|---|---|---|---|---|
| | 0% | 10% | 20% | 30% | 40% | 50% | 60% | 70% | 80% | 90% | 100% |
| Sum | 1.70 | 1.70 | 1.85 | 2.05 | 2.30 | 2.60 | 3.00 | 3.50 | 4.20 | 5.00 | 6.00 |

The point growth is also dependent on the properties of the printing press and on the type of paper printed on, on account of which the coefficient sums of the filters used can vary with these parameters.

We claim:

1. A method of modeling print dots and generating a threshold value matrix for producing a screen form for printing image data, which comprises:
    determining values of the dots of the screen form by comparing tone values of the image data to threshold values of the threshold value matrix, and generating the threshold value matrix by:
    (a) setting dots in a screen data field;
    (b) determining a first position by low-pass filtering the screen data field with at least two low-pass filters having mutually different widths;
    (c) searching for certain partial patterns of dots at the first position or in a neighborhood of the first position, determining at that location a second position, and setting a next dot at the second position; and
    (d) entering a next free threshold value at the second position in the threshold value matrix;
    wherein the print dots are model points with a base surface and a density gradient over the base surface, where the model points are built up from computed points, and a density value according to a function g(x,y) is assigned to a computed point.

2. The method according to claim 1, wherein the function g(x,y) is a Gaussian function.

3. The method according to claim 1, wherein the base surface is a circle or an ellipse.

4. The method according to claim 1, wherein the base surface is a square or a rectangle with rounded corners.

5. The method according to claim 1, which comprises, in an area of overlap between neighboring model points, adding function values of the computed points of the model points to form a sum density.

6. The method according to claim 5, which comprises limiting the sum density to a maximum possible blackening.

7. The method according to claim 6, which comprises distributing percentages of the sum density that exceed the maximum possible blackening to the neighboring computed points.

8. The method according to claim 1, which comprises, in the area of overlap of neighboring model points, determining maximum of function values of the computed points of the model points as a resulting density.

9. The method according to claim 8, which comprises applying to the resulting density of the computed points a filter operation causing a dilatation of the model points.

10. The method according to claim 9, which comprises applying a filter with filter coefficients summing to a value different from 1.

11. The method according to claim 9, which comprises, depending on a tone value of the image data, applying different filters, each with a different sum of filter coefficients.

12. The method according to claim 1, wherein a resolution of the screen data field is greater by an integral factor than a resolution of the threshold value matrix.

* * * * *